United States Patent
Park et al.

(10) Patent No.: US 9,017,836 B2
(45) Date of Patent: Apr. 28, 2015

(54) BATTERY PACK

(75) Inventors: Sanghun Park, Yongin-si (KR); Daeyon Moon, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 344 days.

(21) Appl. No.: 13/426,362

(22) Filed: Mar. 21, 2012

(65) Prior Publication Data

US 2013/0011700 A1 Jan. 10, 2013

Related U.S. Application Data

(60) Provisional application No. 61/504,936, filed on Jul. 6, 2011.

(51) Int. Cl.
| | |
|---|---|
| *H01M 14/00* | (2006.01) |
| *H01M 2/20* | (2006.01) |
| *H01M 2/10* | (2006.01) |
| *H01M 2/26* | (2006.01) |
| *H01M 10/04* | (2006.01) |

(52) U.S. Cl.
CPC ............ *H01M 2/202* (2013.01); *H01M 2/1077* (2013.01); *H01M 2/26* (2013.01); *H01M 2/266* (2013.01); *H01M 10/0472* (2013.01)

(58) Field of Classification Search
None
See application file for complete search history.

(56) References Cited

U.S. PATENT DOCUMENTS

| | | | |
|---|---|---|---|
| 5,709,965 | A | 1/1998 | Grivel et al. |
| 7,714,542 | B2 | 5/2010 | Lee et al. |
| 2004/0009334 | A1* | 1/2004 | Miyamoto et al. ............ 428/209 |
| 2005/0202315 | A1 | 9/2005 | Sugeno et al. |
| 2005/0271934 | A1 | 12/2005 | Kiger et al. |
| 2006/0093897 | A1 | 5/2006 | Choi et al. |
| 2009/0154048 | A1 | 6/2009 | Jang et al. |
| 2009/0325043 | A1 | 12/2009 | Yoon et al. |
| 2010/0092861 | A1* | 4/2010 | Kim .............................. 429/178 |
| 2010/0136422 | A1 | 6/2010 | Koh et al. |
| 2011/0039131 | A1 | 2/2011 | Moon |
| 2011/0151285 | A1* | 6/2011 | Hong et al. ........................ 429/7 |

FOREIGN PATENT DOCUMENTS

| | | |
|---|---|---|
| DE | 19513774 A1 | 10/1995 |
| EP | 1737057 A1 | 12/2006 |
| EP | 2136451 A2 | 12/2009 |
| EP | 2284930 A1 | 2/2011 |
| KR | 10-2005-0015922 | 2/2005 |

(Continued)

OTHER PUBLICATIONS

Extended European Search Report issued on Oct. 17, 2012 by EPO in connection with European Patent Application No. 12175133.3.

*Primary Examiner* — Sarah A Slifka
(74) *Attorney, Agent, or Firm* — Robert E. Bushnell, Esq.

(57) ABSTRACT

A battery pack that can easily combine battery cells stacked in a plurality of layers with each other and easily combine the battery cells with protection circuit devices while reducing manufacturing costs and while providing a compact design suitable for powering small electronic devices such as mobile phones and tablet PCs. The battery pack includes a plurality of first battery cells electrically connected to a first circuit board, a plurality of second battery cells electrically connected to a second circuit board, the second circuit board being electrically connected to the first circuit board and a circuit module electrically connecting the first and second circuit boards to an outside.

19 Claims, 4 Drawing Sheets

(56) References Cited

FOREIGN PATENT DOCUMENTS

| KR | 10-2007-0110565 | 11/2007 |
| KR | 10-2009-0064961 | 6/2009 |
| KR | 10-2011-0017821 | 2/2011 |
| WO | 2006053995 A2 | 5/2006 |
| WO | 2007032273 A1 | 3/2007 |

\* cited by examiner

BATTERY PACK

CLAIM OF PRIORITY

This application makes reference to, incorporates the same herein, and claims all benefits accruing under 35 U.S.C. §119 from an application earlier filed in the U.S. Patent and Trademark Office on the 6 Jul. 2011 and there duly assigned Ser. No. 61/504,936.

BACKGROUND OF THE INVENTION

1. Field of the Invention

Aspects of the present invention relate to a battery pack.

2. Description of the Related Art

In general, secondary batteries can be repeatedly charged and discharged, and are widely used in various fields, including mobile phones, notebook computers, tablet PCs, cameras, camcorders, hybrid electric vehicles, electric vehicles, electric scooters, and so on. High power batteries that use a plurality of battery cells connected to each other in a battery pack are used as power sources for applications requiring high power. The plurality of battery cells are generally electrically connected to each other by a connection member such as wires or a nickel plate.

SUMMARY OF THE INVENTION

Aspects of the present invention provide a battery pack, which can easily combine battery cells consisting of a plurality of layers to each other and easily combine the battery cells to a protection circuit device while reducing the manufacturing cost and while providing a compact, economical battery pack design that can be used to power small electronic devices, such as tablet PCs and mobile phones.

Here, the first circuit board includes a ridge formed on its one surface, and a welding terminal portion formed in the ridge, and the second circuit board includes a welding terminal portion located corresponding to the welding terminal portion of the first flexible board, thereby combining the welding terminal portions of the first circuit board and the second circuit board.

In addition, positive temperature coefficient (PTC) elements may be formed on each top surface of the first circuit board and the second circuit board.

At least one of the above and other features and advantages may be realized by providing a battery pack including first battery cells, a first circuit board connected to electrode tabs of the first battery cells, second battery cells vertically stacked on the first battery cells, a second circuit board connected to electrode tabs of the second battery cells and vertically connected to the first circuit board, a third circuit board having one end connected to the second circuit board, and a circuit module connected to the other end of the third circuit board.

According to one aspect of the present invention, there is provided a battery pack that includes a plurality of first battery cells electrically connected to a first circuit board, a plurality of second battery cells electrically connected to a second circuit board, the second circuit board being electrically connected to the first circuit board and a circuit module electrically connecting the first and second circuit boards to an outside. The second circuit board may be stacked on top of the first circuit board, the plurality of second battery cells may be stacked on top of the plurality of first battery cells. The first circuit board includes a flexible insulation layer, a plurality of connecting wires arranged within the insulation layer, a plurality of welding first terminal portions exposed to an outside of the insulation layer and connected to electrode tabs of ones of the plurality of first battery cells and to ones of the plurality of connecting wires, a plurality of positive thermal coefficient (PTC) terminal portions exposed to an outside of the insulation layer and connected to corresponding ones of the plurality of first battery cells by ones the connecting wires, a plurality of PTC elements electrically connected to corresponding ones of the PTC terminal portions and a second welding terminal portion exposed to an outside of the insulation layer and electrically connected to the second circuit board.

The first circuit board may include a ridge, the second welding terminal portion being arranged on the ridge. The second circuit board may be electrically connected to a welding terminal portion arranged on a ridge of the first circuit board. Portions of the first circuit board other than the ridge, may be spaced-apart from the second circuit board by a distance. The second circuit board may include a first surface and a second surface opposite to the first surface, the second surface facing the first circuit board, the second circuit board may further include a welding terminal portion arranged on the second surface that is electrically mechanically coupled to the first circuit board.

Each of the first and second circuit boards may include a plurality of PTC elements, wherein there is a one-to-one correspondence between a number of PTC elements on the first circuit board and a number of first battery cells, and there is a one-to-one correspondence between a number of PTC elements on the second circuit board and a number of second battery cells. Each of the plurality of first battery cells and the plurality of second battery cells includes a pair of electrode tabs extending to an outside of a sheath, each of the electrode tabs of the plurality of first battery cells being electrically connected to the first circuit board by a weld and being absent of a bend, and each of the electrode tabs of the plurality of second battery cells being electrically connected to the second circuit board by a weld and being absent of a bend.

The first circuit board may electrically connect each of the plurality of first battery cells together, to an outside of the battery pack and to corresponding ones of a plurality of PTC elements, the second circuit board may electrically connect each of the plurality of second battery cells together, to an outside of the battery pack and to corresponding ones of a plurality of PTC elements.

The battery pack may also include a third circuit board electrically connecting the second circuit board to the circuit module. The battery pack may also include a metallic cover plate that encloses the plurality of first and second battery cells, the first, second and third circuit boards, and the circuit module, the cover plate being perforated by an aperture, the circuit module including a connecting portion that passes through the aperture to an outside. The battery pack may also include insulation sheets arranged between each of the plurality of first and second battery cells and the cover plate and between the plurality of first battery cells and the plurality of second battery cells.

The plurality of first battery cells may include four first battery cells, and the plurality of second battery cells may include four second battery cells. Two of the four first battery cells may be arranged on an opposite side of the first circuit board than another two of the four first battery cells, and wherein two of the four second battery cells may be arranged on an opposite side of the second circuit board than another two of the four second battery cells. The plurality of second battery cells may be arranged on top of the plurality of first battery cells, the first circuit board may have a ridge having a height that corresponds to a thickness of ones of the plurality of second battery cells. Each of the plurality of first battery cells and the plurality of second battery cells may be pouch type battery cells. Each of the first and second circuit boards may be flexible. Each of the first, second and third circuit boards may be flexible.

The second circuit board may include a flexible insulation layer, a plurality of connecting wires arranged within the insulation layer, a plurality of first welding terminal portions exposed to an outside of the insulation layer and connected to electrode tabs of ones of the plurality of first battery cells and to ones of the plurality of connecting wires, a plurality of positive thermal coefficient (PTC) terminal portions exposed to an outside of the insulation layer and connected to corresponding ones of the plurality of first battery cells by ones the connecting wires, a plurality of PTC elements electrically connected to corresponding ones of the PTC terminal portions, a second welding terminal portion exposed to an outside of the insulation layer and electrically connected to the first circuit board and a soldering terminal portion exposed to an outside of the insulation layer and electrically connected to the third circuit board.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

A preferred embodiment will now be described more fully hereinafter with reference to the accompanying drawings; however, it may be embodied in different forms and should not be construed as limited to the embodiments set forth herein. Rather, the embodiment is provided so that this disclosure will be thorough and complete, and will fully convey the scope of the invention to those skilled in the art.

Hereinafter, a configuration of a battery pack according to the embodiment will be described.

Figure 1:
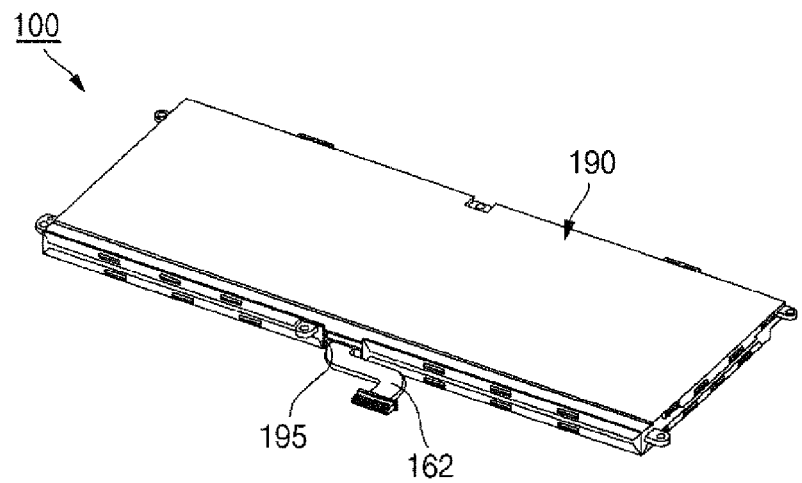
FIG. 1 is an assembled perspective view of a battery pack according to an embodiment of the present invention.
Figure 2:
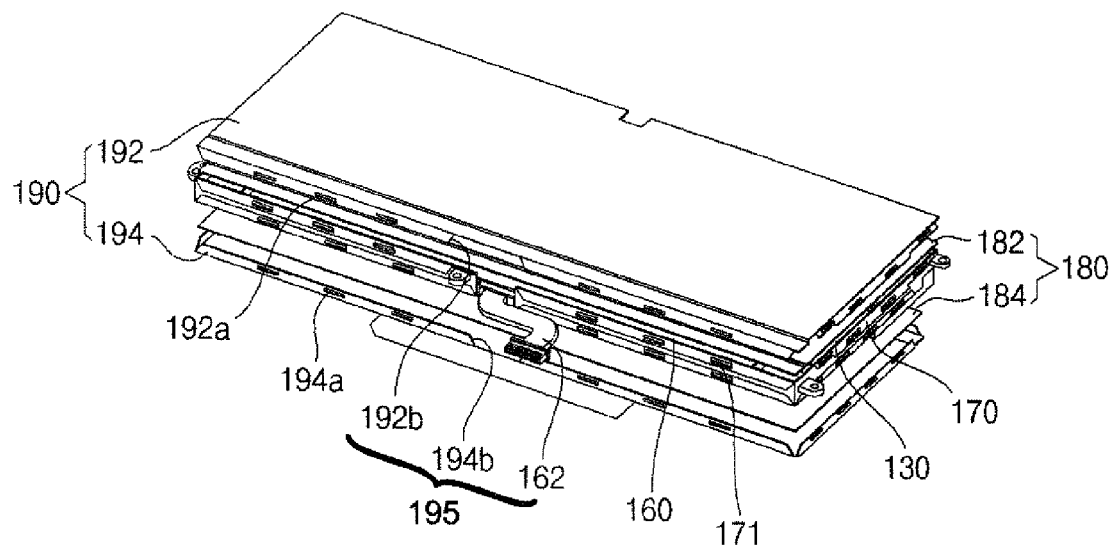
FIG. 2 is an exploded perspective view of the battery pack shown in FIG. 1.
Figure 3:
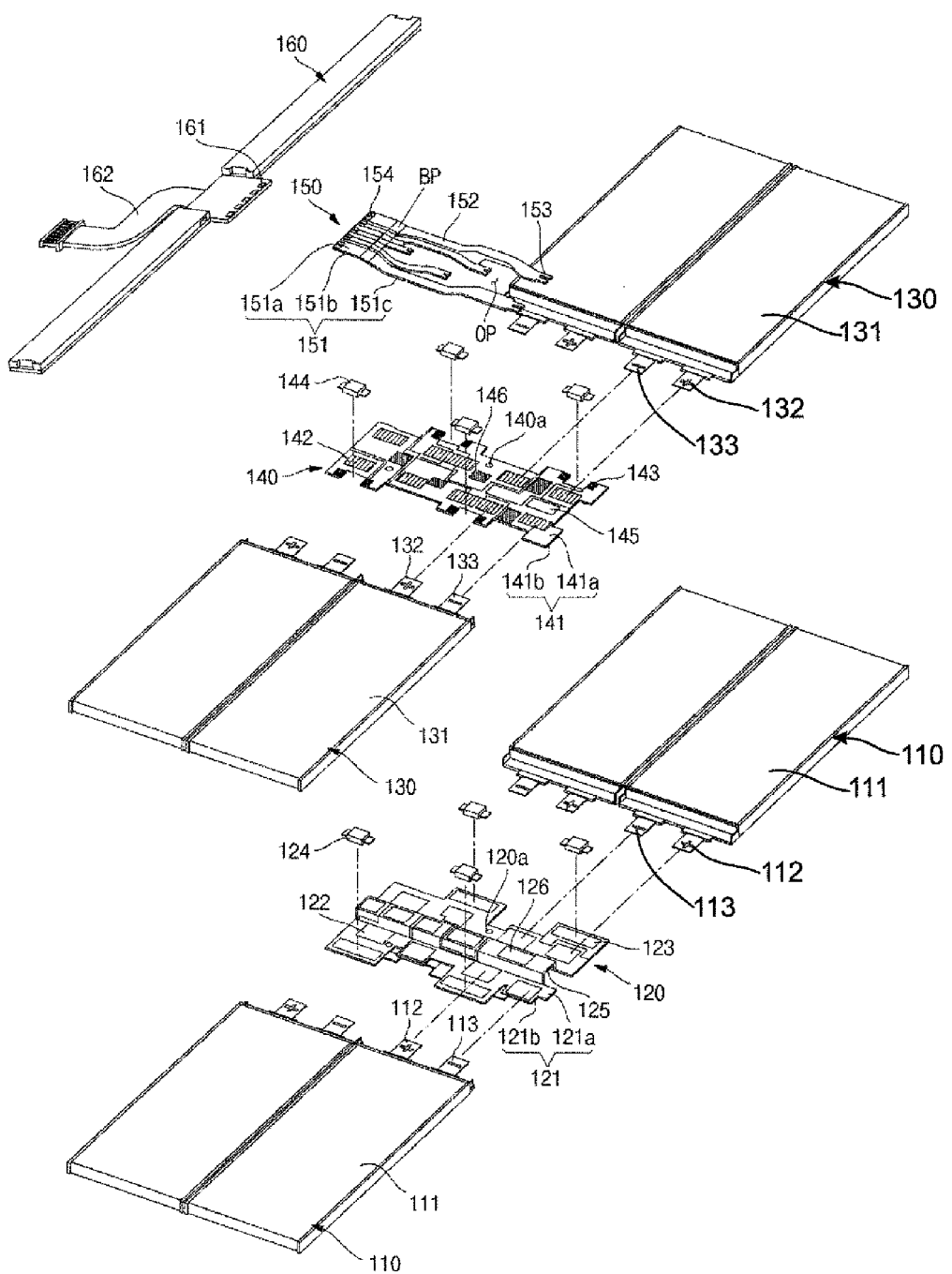
FIG. 3 is an exploded perspective view of the battery pack shown in FIG. 1, from which a case is removed.
Figure 4:
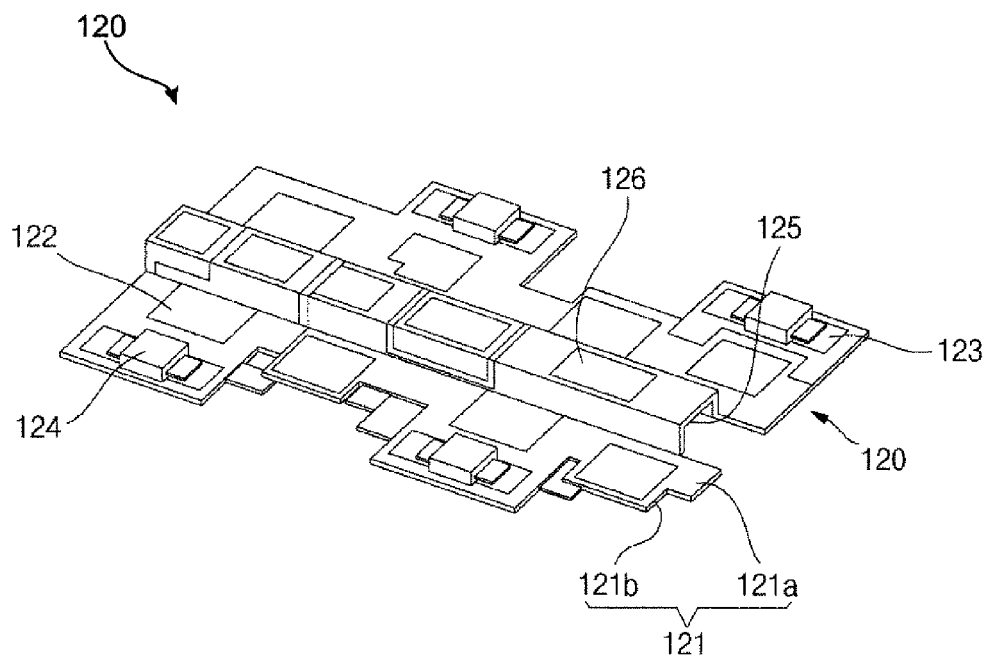
FIG. 4 is an enlarged perspective view illustrating a first circuit board in the battery pack shown in FIG. 3.
Figure 5:
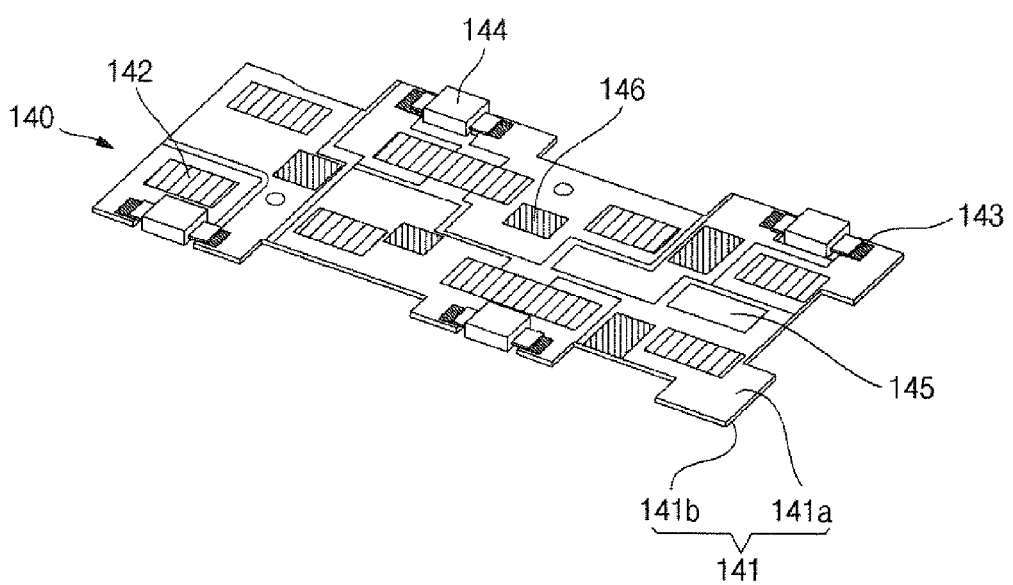
FIG. 5 is an enlarged perspective view illustrating a second circuit board in the battery pack shown in FIG. 3.
Figure 6:
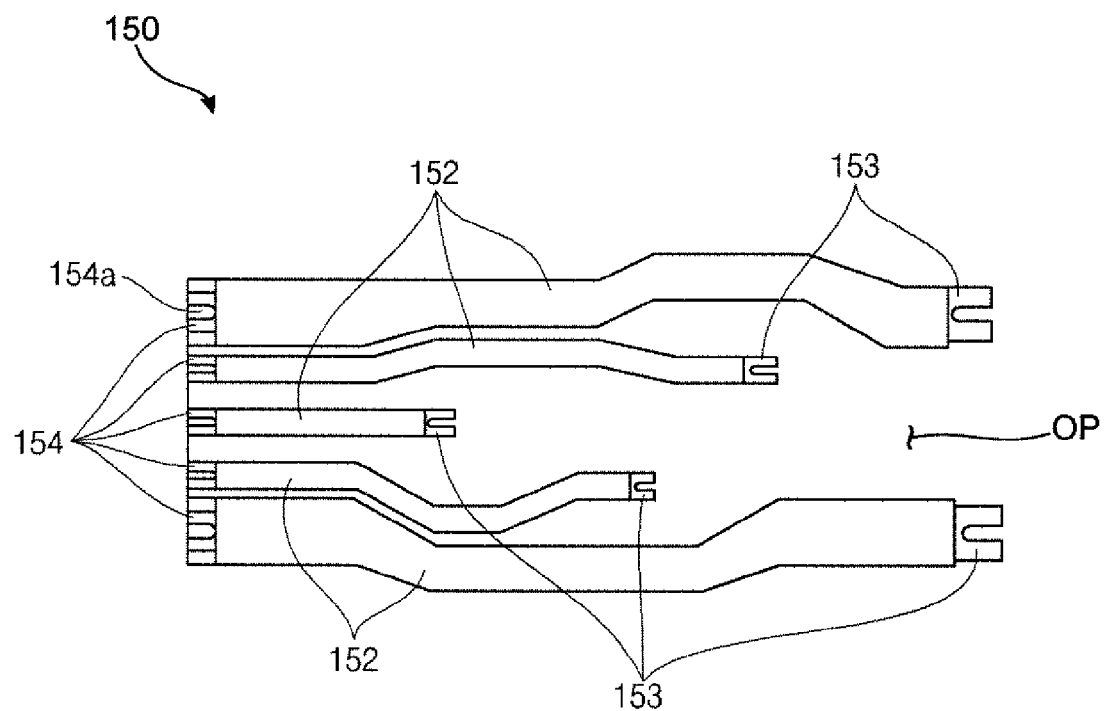
FIG. 6 is an enlarged perspective view illustrating a third circuit board in the battery pack shown in FIG. 3.

Turning now to the drawings, FIG. 1 is an assembled perspective view of a battery pack according to an embodiment of the present invention, FIG. 2 is an exploded perspective view of the battery pack shown in FIG. 1, FIG. 3 is an exploded perspective view of the battery pack shown in FIG. 1, from which a case is removed, FIG. 4 is an enlarged perspective view illustrating a first circuit board of the battery pack shown in FIG. 3, FIG. 5 is an enlarged perspective view illustrating a second circuit board of the battery pack shown in FIG. 3, and FIG. 6 is an enlarged perspective view illustrating a circuit flexible board of the battery pack shown in FIG. 3.

Referring now to FIGS. 1 to 6, the battery pack 100 according to an embodiment of the present invention includes a plurality of first battery cells 110, a first circuit board 120, a plurality of second battery cells 130, a second circuit board 140, a third circuit board 150, a circuit module 160, a frame 170, an insulation member 180, and a cover plate 190.

The first battery cells 110 include a plurality of battery cells that perform a discharging operation by supplying power to an external load and a charging operation by receiving power from a charging device. Each of the first battery cells 110 includes an electrode assembly (not shown) including a positive electrode, a negative electrode and a separator interposed between the positive and negative electrodes, a sheath 111 storing the electrode assembly, an electrolyte (not shown), and electrode tabs 112 and 113 electrically connected to the electrode assembly and extending to an outside of the sheath 111. Here, the sheath 111 may be a pouch case, and the first battery cells 110 having the pouch case can be easily processed into a desired shape. Thus, the first battery cells 110 may be easily applied to an external electronic device such as an external load.

While FIG. 3 shows that the plurality of first battery cells 110 includes 4 battery cells as per an embodiment of the present invention, the number of battery cells may vary according to the output power level desired. Pairs of the first battery cells 110 are coupled to each other in parallel and the electrode tabs 112 and 113 are disposed in pairs toward the central region between the pairs of first battery cells 110 that face each other and are connected to the first circuit board 120.

The first circuit board 120 is disposed in the central region between the pairs of the electrode tabs 112 and 113 facing each other, and is connected to the electrode tabs 112 and 113 of each of the plurality of first battery cells 110. As a result, the first circuit board 120 is electrically connected to each of the first battery cells 110, and electrically connects the first battery cells 110 to each other.

In the present invention, the first circuit board 120 is a wiring board where PTC elements, battery electrode tabs, and other wiring boards may be electrically mechanically coupled thereto. First circuit board 120 is preferably flexible, but the present invention is in no way so limited, as the first circuit board 120 may instead be rigid, such as a printed circuit board (PCB). It is to be understood that having the first circuit board flexible makes the assembly process of battery pack 100 easier as it is more easier to weld and solder the constituent elements together when first circuit board 120 is flexible than when first circuit board 120 is rigid. The first circuit board 120 can include an insulation layer 121, a plurality of first welding terminal portions 122, positive temperature coefficient (PTC) terminal portions 123, PTC elements 124, a ridge 125, and second welding terminal portions 126.

The insulation layer 121 is substantially plate-shaped and has a first surface 121a and a second surface 121b opposite to the first surface 121a, forming an external appearance of the first circuit board 120. When first circuit board 120 is flexible, the insulation layer 121 may be made out of a flexible, insulating material such as polyimide for example. Cell connecting wires (not shown) for electrically connecting the plurality of first battery cells 110 to each other are formed within the insulation layer 121. The cell connecting wires and board connecting wires (not shown) may be made of a conductive material, such as nickel for example.

The plurality of first welding terminal portions 122 are formed to expose ends of the cell connecting wires to an outside of the insulation layer 121, on either of the first surface 121a or the second surface 121b of the insulating layer 121. The plurality of first welding terminal portions 122 are electrically mechanically connected to the electrode tabs 112 and 113 of each of the plurality of first battery cells 110 by welding.

The PTC terminal portions 123 are electrically connected to the cell connecting wires and the board connecting wires and are exposed to the outside of the insulation layer 121, for example, on the first surface 121a. The PTC terminal portions 123 are electrically mechanically connected to the PTC elements 124 by welding.

When an abnormal state, such as a high temperature state, occurs to the plurality of first battery cells 110 due to, for example, overcharge, the PTC elements 124 detect the abnormal state and cause an open circuit condition where current flow is stopped. The PTC elements 124 are provided in a one-to-one correspondence with respect to each of the cells in the first battery cells 110, and each of the PTC elements 124 is connected to a corresponding one of the first battery cells 110. The PTC elements 124 vary resistance values according to the temperature of the first battery cells 110, thereby controlling the current of the first battery cells 110.

The notion of having a one-to-one correspondence between the PTC elements 124 and the battery cells 110 as opposed to having one PTC element for all of the battery cells is to enhance the sensitivity to temperature of the battery cells. In the present design, a balance between expenses and safety is achieved by having one protection circuit module (PCM) for the entire battery pack 100 but also by having a one-to-one correspondence between the PTC elements and the battery cells. Such a balance between costs and safety provides the enhanced sensitivity of temperature of the battery cells while containing costs.

The ridge 125 protrudes from substantially the center of the insulation layer 121. The ridge 125 protrudes toward an upper portion of first surface 121a of insulation layer 121 and has a height equal to or greater than a thickness of each of the first battery cells 110. The ridge 125 protrudes high enough to contact the second circuit board 140 coupled to the upper portion of the first circuit board 120. In addition, the first circuit board 120 includes an alignment hole 120a formed at a region of the insulation layer 121. The alignment hole 120a is formed for the purpose of aligning vertical positions at which the first circuit board 120 is to be combined with the second circuit board 140. A separate pin (not shown) is positioned between the alignment hole 120a and the second circuit board 140 to achieve welding between the first circuit board 120 and the second circuit board 140 after aligning the vertical positions.

The second welding terminal portion 126 is formed on a top surface of the ridge 125. The second welding terminal portion 126 is electrically mechanically connected to the second circuit board 140 coupled to the upper portion of the first circuit board 120 by welding. The second welding terminal portion 126 electrically connects the first circuit board 120 to the second circuit board 140 so that the first battery cells 110 may operate with the same electrical signals as those of the second battery cells 130 connected to the second circuit board 140.

The second battery cells 130 are positioned on the first battery cells 110. That is to say, the second battery cells 130 are stacked on top of the first battery cells 110. In addition, the second battery cells 130 are connected to the second circuit board 140 in the same manner as the first battery cells 110 are connected to the first circuit board 120. That is to say, each of the second battery cells 130 are surrounded by a sheath 131, and the electrode terminals 132 and 133 protruding outwardly from each of the second battery cells 130 are connected to the second circuit board 140 by, for example, welding. Here, the second battery cells 130 are connected to the circuit module 160 through the second circuit board 140 and the third circuit board 150, thereby allowing electrical signals to be input to and output from the second battery cells 130. In addition, as described above, since the first circuit board 120 and the second circuit board 140 are electrically connected, the second battery cells 130 may receive the same electrical signals as those of the first battery cells 110.

The second circuit board 140 has a configuration similar to that of the first circuit board 120. That is to say, the second circuit board 140 is a wiring board where PTC elements, battery electrode tabs, and other wiring boards are electrically mechanically coupled thereto. Second circuit board 140 is preferably flexible, but the present invention is in no way so limited, as the second circuit board 140 may instead be rigid, such as a printed circuit board (PCB). It is to be understood that having the second circuit board 140 flexible makes the assembly process of battery pack 100 easier as it is more easier to weld and solder the constituent elements together when second circuit board 140 is flexible than when second circuit board 140 is rigid. The second circuit board 140 includes an insulation layer 141, a plurality of first welding terminal portions 142, positive temperature coefficient (PTC) terminal portions 143, PTC elements 144, second welding terminal portions 145, and soldering terminal portions 146.

The insulation layer 141 may be formed in the same manner as the insulation layer 121 of the first circuit board 120 and is shaped corresponding to the insulation layer 121. Preferably, insulation layer 141 is flexible, but the present invention is in no way so limited. The insulation layer 141 has a first surface 141a and a second surface 141b opposite to the first surface 141a, forming an external appearance of the second circuit board 140.

The plurality of first welding terminal portions 142 are electrically mechanically connected to the electrode tabs 132 and 133 of each of the plurality of second battery cells 130 by welding.

The PTC terminal portions 143 are exposed to the outside of the insulation layer 141, for example, on the first surface 141a of the insulation layer 141. The PTC elements 144 are the same as the PTC elements 124 of the first circuit board 120 and may be electrically mechanically connected to the PTC terminal portions 143 by, for example, soldering.

The second welding terminal portions 145 may be exposed on both a first surface 141a and a second surface 141b of insulation layer 141, and the second welding terminal portions 145 of both surfaces may be at a same location on both sides of the second circuit board 140. The second welding terminal portions 145 may be arranged at a location that corresponds to a location of the second welding terminal portions 126 of the first circuit board 120. The second welding terminal portions 145 of the second circuit board 140 and the second welding terminal portions 126 of the first circuit board 120 are combined to each other by welding. As a result, the first circuit board 120 and the second circuit board 140 may be electrically and mechanically coupled to each other through the second welding terminal portions 126 and 145.

In addition, the second circuit board 140 includes an alignment hole 140a formed at a region of the insulation layer 141. The alignment hole 140a is located corresponding to the alignment hole 120a of the first circuit board 120. Therefore, as described above, after the first circuit board 120 and the second circuit board 140 are combined to each other using a separate pin (not shown), the second welding terminal portions 126 of the first circuit board 120 and the second welding terminal portions 145 of the second circuit board 140 may be welded.

The soldering terminal portions 146 of the second circuit board 140 may be exposed to the outside of the insulation layer 141 on the first surface 141a of insulation layer 141, and may be electrically mechanically connected to first soldering terminal portions 153 of the third circuit board 150 by soldering. Here, the soldering is usually employed when the soldering terminal portions 146 of the second circuit board 140 and first soldering terminal portions 153 of the third circuit board 150 are made out of different materials.

The third circuit board 150 is disposed on the second circuit board 140 and electrically connects the second circuit board 140 to the circuit module 160. In the present invention, the third circuit board 150 is a wiring board that electrically connects second circuit board 140 to circuit module 160. Third circuit board 150 is preferably flexible, but the present invention is in no way so limited, as the third circuit board 150 may instead be rigid, such as a printed circuit board (PCB). It is to be understood that having the third circuit board 150 flexible makes the assembly process of battery pack 100 easier as it is more easier to weld and solder the constituent elements together when third circuit board 150 is flexible than when third circuit board 150 is rigid. The third circuit board 150 includes an insulation layer 151, a plurality of connection wires 152, a plurality of first soldering terminal portions 153 and a plurality of second soldering terminal portions 154.

The insulation layer 151 is substantially plate-shaped and has a first surface 151a, a second surface 151b opposite to the first surface 151a, and a third surface 151c connecting the first surface 151a to the second surface 151b, forming an external appearance of the third circuit board 150. The insulation layer 151 includes a plurality of connection wires 152 within and is formed such that a plurality of first soldering terminal portions 153 and second soldering terminal portions 154 are exposed to an outside of the insulation layer 151. In addition, the insulation layer 151 has an open portion OP formed between each of the plurality of first soldering terminal portions 153. When third circuit board 150 is flexible, the insulation layer 151 may have a bend portion BP formed near the second soldering terminal portions 154 and the circuit module 160. The bend portion BP forms a level difference between the first soldering terminal portions 153 and the second soldering terminal portions 154, resulting in a height difference between the second circuit board 140 and the circuit module 160. When there is a height difference between the circuit module 160 and the second circuit board 140, the bend portion BP allows the circuit module 160 and the first circuit board 140 to be connected to each other in a stable manner. When third circuit board 150 is flexible, the insulation layer 151 may be made out of a flexible, insulating material, such as polyimide for example.

The plurality of connection wires 152 are patterns for electrically connecting the second circuit board 140 to the circuit module 160 and are formed within the insulation layer 151. The plurality of connection wires 152 may convey information pertaining to the power and voltages of the first and second battery cells 110 and 130 to circuit module 160 or an outside of battery pack 100. The plurality of connection wires 152 may be made of a conductive material, such as copper, for example.

The plurality of first soldering terminal portions 153 extend horizontally from one side end (or third surface 151c) of the plurality of connection wires 152 and are exposed to the outside of the insulation layer 151. The plurality of first soldering terminal portions 153 are arranged at locations that correspond to the soldering terminal portions 146 of the second circuit board 140 and may be electrically mechanically connected to the soldering terminal portions 146 of the second circuit board 140 by soldering, for example. The plurality of first soldering terminal portions 153 are integrally formed with the plurality of connection wires 152, and may be made out of the same material as the plurality of connection wires 152.

The plurality of second soldering terminal portions 154 are arranged at an opposite end of the plurality of connection wires 152 and extend horizontally from an opposite third surface 151c of the insulation layer 151. The plurality of second soldering terminal portions 154 electrically mechanically connect to a plurality of conductive pads 161 of the circuit module 160 by soldering. Here, the plurality of second soldering terminal portions 154 are substantially rectangular in shape and include grooves 154a. Grooves 154a provide for a space to be filled with lead upon soldering the plurality of second soldering terminal portions 154 to the plurality of conductive pads 161, thereby enhancing electrical mechanical coupling forces between the plurality of second soldering terminal portions 154 and the plurality of conductive pads 161.

The circuit module 160 includes the plurality of conductive pads 161 and is electrically mechanically connected to the third circuit board 150 when the plurality of second soldering terminal portions 154 contacts the plurality of conductive pads 161. The circuit module 160 is electrically connected to the plurality of battery cells 110 and 130 through the first circuit board 120, the second circuit board 140 and the third circuit board 150. Although not shown, the circuit module 160 includes on an insulating board, a circuit capable of charging and discharging the plurality of battery cells 110 and 130 and a protection circuit or PCM for preventing overcharge or overdischarge of the plurality of battery cells 110 and 130. In addition, the circuit module 160 includes a connecting portion 162 installed to be electrically connected to an external electronic device such as an external load or a charging device. The insulating board forming the circuit module 160 may be a rigid board.

Referring now to FIG. 2, frame 170 is formed to receive the plurality of battery cells 110 and 130, the first circuit board 120, the second circuit board 140, the third circuit board 150, and the circuit module 160. The frame 170 may be made out of an insulating material and may include fastening protrusions 171 formed on its external side.

The insulation member 180 includes a first insulation sheet 182 and a second insulation sheet 184 attached to top and bottom of the plurality of battery cells 110 and 130, respectively. The insulation member 180 prevents unnecessary shorts between the plurality of battery cells 110 and 130 and the cover plate 190.

The cover plate 190 is formed to surround the plurality of battery cells 110 and 130, the first circuit board 120, the second circuit board 140, the third circuit board 150, the circuit module 160, the frame 170, and the insulation member 180, forming an external appearance of the battery pack 100. In addition, the cover plate 190 is made of a metallic material and reinforces the strength of sheaths 111 and 131 that are relatively weak in protecting the plurality of battery cells 110 and 130 against external forces. Specifically, the cover plate 190 include a first cover plate 192 and a second cover plate 194 disposed on top of and beneath the plurality of battery cells 110 and 130, respectively. The first cover plate 192 has a first fastening hole 192a, and the second cover plate 194 has a second fastening hole 194a. The first fastening hole 192a and the second fastening hole 194a are engaged to the fastening protrusions 171, thereby combining the frame 170 to the cover plate 190. In addition, the first cover plate 192 has a first connector exposing groove 192b, and the second cover plate 194 has a second connector exposing groove 194b. The first connector exposing groove 192b and the second connector exposing groove 194b form a connector exposing hole 195 of the cover plate 190. The connecting portion 162 of the circuit module 160 is exposed to the outside of the cover plate 190 through the connector exposing hole 195.

As described above, in the battery pack 100 according to the embodiment of the present invention, the electrode tabs 112 and 113 of the first battery cells 110 are connected to the first circuit board 120, the electrode tabs 132 and 133 of the second battery cells 130 are connected to the second circuit board 140, and the second welding terminal portions 126 formed on the ridge 125 of the first circuit board 120 are welded to the second welding terminal portions 145 of the second circuit board 140, thereby easily connecting the battery cells 110 and 130 to each other when the battery cells 110 and 130 are stacked in multiple layers.

In addition, since the PTC portions 123 and 143 are formed in the first circuit board 120 and the second circuit board 140 respectively, they may be formed in the vicinity of the battery cells 110 and 130 and may be stably coupled to the PTC elements 124 and 144 respectively. By having a one-to-one correspondence between PTC elements and battery cells while having one PCM for the entire battery pack, a balance between costs and safety is struck where enhanced temperature sensitivity of the battery cells is realized while costs are contained.

Further, it is not necessary to bend the electrode tabs 112 and 113 of the first battery cells 110 and the electrode tabs 132 and 133 of the second battery cells 130 when combining the first and second battery cells 110 and 130 to each other, thereby preventing the PTC elements 124 and 144 from being separated from the first and second battery cells 110 and 130, respectively.

In the battery pack according to the embodiment of the present invention, the electrode tabs of the first battery cells are connected to the first circuit board and the electrode tabs of the second battery cells are connected to the second circuit board, and second welding terminal portions formed on the ridge of the first circuit board is welded to welding terminal portions of the second circuit board, thereby easily connecting the first and second battery cells to each other when the first and second battery cells are stacked in a plurality of layers.

In addition, since PTC elements are formed on the first circuit board and the second circuit board, the PTC elements may be formed in the vicinity of the battery cells and may be stably combined with the battery cells.

Further, since it is not necessary to bend electrode tabs when the battery cells are connected to each other, the PTC elements can be prevented from being separated from the battery cells.

Further, since a sizable number of battery cells can be arranged in a compact space, the battery pack of the present invention can serve to power electronic devices where miniaturization is required, such as mobile phones and tablet PCs.

Still yet, by having the circuit boards flexible, assembly process and the welding and soldering processes can be simplified.

An exemplary embodiment of a battery pack has been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
a plurality of first battery cells electrically connected to a first circuit board;
a plurality of second battery cells electrically connected to a second circuit board, the second circuit board being electrically connected to the first circuit board; and
a circuit module electrically connecting the first and second circuit boards to an outside, wherein the first circuit board and the second circuit board are stacked together and connected electrically and mechanically to each other, wherein the first circuit board comprises:
a flexible insulation layer;
a plurality of connecting wires arranged within the insulation layer;
a plurality of first welding terminal portions exposed to an outside of the insulation layer and connected to electrode tabs of ones of the plurality of first battery cells and to ones of the plurality of connecting wires;
a plurality of positive thermal coefficient (PTC) terminal portions exposed to an outside of the insulation layer and connected to corresponding ones of the plurality of first battery cells by ones the connecting wires;
a plurality of PTC elements electrically connected to corresponding ones of the PTC terminal portions; and
a second welding terminal portion exposed to an outside of the insulation layer and electrically connected to the second circuit board; and
a ridge that protrudes substantially from a center of the insulating layer and being comprised of the insulating layer, the second welding terminal portion being arranged on the ridge.

2. The battery pack of claim 1, the second circuit board being stacked on top of the first circuit board, the plurality of second battery cells being stacked on top of the plurality of first battery cells.

3. The battery pack of claim 1, wherein a first pair of the first battery cells are arranged on the first circuit board at a first side of the ridge, and a second pair of the first battery cells are arranged on the first circuit board at a second and opposite side of the ridge, wherein the electrode tabs of each of the first and second pair of the first battery cells protrude toward the ridge.

4. The battery pack of claim 1, wherein the flexible insulation layer being folded to produce the ridge at a center of the first circuit board and to accommodate ones of the first battery cells on either side of the ridge, and wherein the second circuit board is electrically connected to the second welding terminal portion.

5. The battery pack of claim 4, wherein the electrode tabs of the first battery cells protrude from a sheath that includes an electrode assembly, wherein each of the electrode tabs of each of the first battery cells extend towards the ridge and are connected to an the outside of the battery pack by the circuit module.

6. The battery pack of claim 4, the second circuit board includes a first surface and a second surface opposite to the first surface, the second surface facing the first circuit board, the second circuit board further including a welding terminal portion arranged on the second surface and at a center thereof that is electrically and mechanically coupled to the first circuit board.

7. The battery pack of claim 1, wherein the second circuit board comprises a plurality of PTC elements, wherein there is a one-to-one correspondence between a number of PTC elements on the first circuit board and a number of first battery cells, and there is a one-to-one correspondence between a number of PTC elements on the second circuit board and a number of second battery cells.

8. The battery pack of claim 1, wherein each of the plurality of first battery cells and the plurality of second battery cells includes a pair of electrode tabs extending to an outside of a sheath, each of the electrode tabs of the plurality of first battery cells being electrically connected to the first circuit board by a weld and being absent of a bend, and each of the electrode tabs of the plurality of second battery cells being electrically connected to the second circuit board by a weld and being absent of a bend.

9. The battery pack of claim 1, further comprising:
the first circuit board electrically connecting each of the plurality of first battery cells together, to an outside of the battery pack and to corresponding ones of a plurality of PTC elements, and
the second circuit board electrically connecting each of the plurality of second battery cells together, to an outside of the battery pack and to corresponding ones of a plurality of PTC elements.

10. The battery pack of claim 1, each of the plurality of first battery cells and the plurality of second battery cells are pouch type battery cells.

11. The battery pack of claim 1, wherein the plurality of first battery cells is composed of four first battery cells, and the plurality of second battery cells is composed of four second battery cells.

12. The battery pack of claim 11, wherein two of the four first battery cells are arranged on an opposite side of a central ridge of the first circuit board than another two of the four first battery cells, and wherein two of the four second battery cells are arranged on an opposite side of the second circuit board than another two of the four second battery cells.

13. The battery pack of claim 11, wherein the plurality of second battery cells are arranged on top of the plurality of first battery cells, the ridge being comprised of a flexible insulation layer, the circuit module being an only circuit module for the entire battery pack.

14. The battery pack of claim 13, further comprising a third circuit board electrically connecting the second circuit board to the circuit module.

15. The battery pack of claim 14, further comprising a metallic cover plate that encloses the plurality of first and second battery cells, the first, second and third circuit boards, and the circuit module, the cover plate being perforated by an aperture, the circuit module including a connecting portion that passes through the aperture to an outside.

16. The battery pack of claim 15, further comprising a plurality of insulation sheets arranged between each of the plurality of first and second battery cells and the cover plate and between the plurality of first battery cells and the plurality of second battery cells.

17. The battery pack of claim 14, wherein the second circuit board comprises:
a flexible insulation layer;
a plurality of connecting wires arranged within the insulation layer;
a plurality of first welding terminal portions exposed to an outside of the insulation layer and connected to electrode tabs of ones of the plurality of second battery cells and to ones of the plurality of connecting wires;
a plurality of positive thermal coefficient (PTC) terminal portions exposed to an outside of the insulation layer and connected to corresponding ones of the plurality of second battery cells by ones the connecting wires;
a plurality of PTC elements electrically connected to corresponding ones of the PTC terminal portions;
a second welding terminal portion exposed to an outside of the insulation layer and electrically connected to the first circuit board; and
a soldering terminal portion exposed to an outside of the insulation layer and electrically connected to the third circuit board.

18. The battery pack of claim 14, wherein each of the first, second and third circuit boards are flexible.

19. The battery pack of claim 18, the plurality of second battery cells being arranged on top of the plurality of first battery cells, the circuit module being an only circuit module and an only electrical connection to an outside for an entirety of the battery pack.

* * * * *